Figure 1:
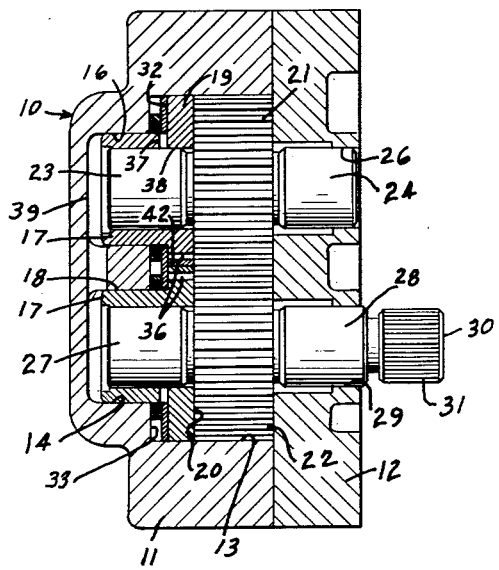

Aug. 15, 1961

H. F. PRASSE 2,996,015

PRESSURE LOADED PUMP

Filed Oct. 21, 1959

Inventor
Herbert F. Prasse
by Hill, Sherman, Meroni, Gross & Simpson Attys.

United States Patent Office 2,996,015
Patented Aug. 15, 1961

2,996,015
PRESSURE LOADED PUMP
Herbert F. Prasse, Gates Mills, Ohio, assignor to Thompson Ramo Wooldridge Inc., Cleveland, Ohio, a corporation of Ohio
Filed Oct. 21, 1959, Ser. No. 847,809
10 Claims. (Cl. 103—126)

This invention relates generally to pumps and more particularly to a pressure-loaded gear pump wherein an improved sealing arrangement is provided for a movable pressure-loaded bushing comprising a pair a concentrically disposed rings, the innermost ring comprising an O ring sealing member stretched around the bushing and surrounded by a rigid back-up ring, the rings being disposed axially between an adjoining casing wall and between a plate-type spring member so the bushing will be sealed in the casing without the necessity of machined counterbores or grooves.

In pressure-loaded gear pumps heretofore provided, it is customary to provide a pump casing which is bored and counterbored, or provided with special grooves adapted to receive an O ring sealing member. The O ring seal member is for the purpose of sealing the movable bushing relative to the casing, particularly insofar as leakage may occur along the length of the bushing away from a pressure control chamber behind a motive surface on the bushing.

In the case of a casing having such a counterbore, the counterbores have to be truly concentric with respect to the supporting bore for the bushing and such arrangements also require the use of O rings of uniform cross-section around their entire circumference. Furthermore, variations from true concentricity and true uniform cross-section frequently result in seizure of the bushings at tight spots. This eventually causes cocking of the bushings and unsatisfactory sealing and seating of the bushings on the gear faces.

In accordance with the principles of the present invention, the necessity of special grooves or counterbores in the pump housing to provide seals for the pressure-loaded gear-supporting bushings, is entirely eliminated without loss of function. O rings are stretched around the bushings and are then surrounded by rigid back-up rings. A simple finger spring-equipped plate-type spring is interposed between the flanges of the bushings and the O rings to thereby seal the bushings for pressure loading and also to preload the bushings mechanically.

It is an object of the present invention, therefore, to provide an improved sealing arrangement for a pressure-loaded gear pump.

Another object of the present invention is to provide seals for gear-supporting bushings wherein the use of special counterbores or grooves is completely eliminated.

Another object of the present invention is to provide a sealing arrangement which tolerates variations from true concentricity and true uniform cross-section of rubber O rings.

Yet another object of the present invention is to provide a sealing and loading arrangement for bushings of a pressure-loaded gear pump which reduces cocking and unsatisfactory sealing and seating of the bushings in the pump.

Many other features, advantages and additional objects of the present invention will become manifest to those versed in the art upon making reference to the detailed description which follows and the accompanying sheet of drawings in which a preferred structural embodiment of a pressure-loaded gear pump incorporating the principles of the present invention is shown by way of illustrative example.

Figure 2:
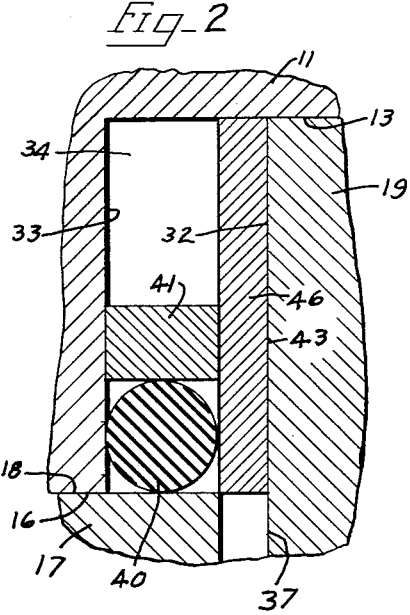
Figure 3:
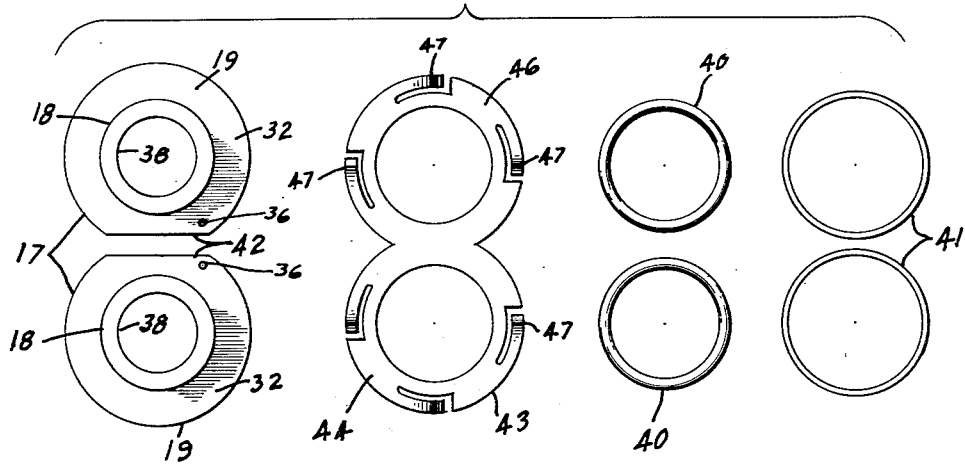

On the drawings:
FIGURE 1 is a cross-sectional view of a pressure-loaded gear pump incorporating the principles of the present invention;
FIGURE 2 is a fragmentary enlarged view showing additional details of construction of the pump of FIGURE 1; and
FIGURE 3 is an exploded view showing the bushings, the plate spring and the ring members provided in accordance with the principles of the present invention.

As shown in the drawings:
The pump of the present invention is indicated generally at 10 and comprises a casing 11 closed by a cover member 12 and together therewith forming a housing provided with the usual pump inlet, pump outlet, and pumping chamber therebetween, the pumping chamber being more particularly shown at 13.

Axially adjacent the pumping chamber 13 which may be formed as an enlarged cavity within the casing 11, there is formed two axially extending bores shown at 14 and 16, respectively. In each of the bores 14 and 16, there is provided a generally tubular bearing end plate member or bushing shown generally at 17. Each of the bushings 17 is of identical construction and, accordingly, like reference numerals are employed in connection with the description of the structural characteristics thereof.

First of all, each bushing 17 has a generally tubular body portion including an outer peripheral surface 18 adapted to slidably engage an adjoining surface of a corresponding bore wall of the bores 14 and 16.

Each bushing 17 is further provided with a radially outwardly extending flange 19 formed at one end of the bushing 17 and extending radially outwardly into the cavity 13, thereby to form a radially extending sealing surface 20 which is adapted to sealingly engage against the adjoining side face of a corresponding gear rotatable in the cavity 13. More specifically, the fluid displacement means for moving the fluid from the inlet to the outlet are shown as comprising intermeshing gears, including a driven gear 21 and a driver gear 22. The driven gear 21 has a gear shaft extension 23 received in one of the bushings 17 and journaled thereby, while the opposite gear shaft extension shown at 24 is journaled in a bearing surface 26 formed by the cover member 12.

The driver gear 22 has a gear shaft extension shown at 27 received in a corresponding bushing 17. The opposite gear shaft extension of the driver gear is shown at 28 and is journaled in a bearing surface 29 formed in the cover member 12. The gear shaft extension 28 extends outwardly of the cover member 12 and has a driver coupling 30 formed with suitable splines 31 adapted to be connected to a power source, thereby to rotatably drive the gears 21 and 22.

Each bushing 17 is further characterized by the formation on the flange 19 of a rear motive surface 32, which is spaced from an adjoining radial wall 33 of the casing 11, thereby to form a pressure control chamber 34. The pressure control chamber 34 communicates with a source of pump-generated pressure, for example, the discharge zone of the pump through drilled passages indicated at 36.

The bushings 17 are shown with a radially extending opening 37 between the pressure control chamber 34 and a bearing surface 38 formed by the bore of each respective bushing 17, thereby to lubricate and cool the bearing surface 38 in journaling a corresponding gear.

In pumps of this type, it is necessary to seal between the low pressure areas of the pump, for example, at the end of the bushings, as shown at 39, and the pressure control chamber 34. According to the prior art, counterbores are supplied in the casing 11 for receiving and supporting a sealing member such as a rubber O ring. The prior art has also contemplated the provision of a groove either in the casing or in the tubular portion of the bushing for receiving and seating an O ring sealing member. Such counterbores or grooves are required to be truly concentric with respect to the supporting bore for the bushing, thereby presenting specific machining problems. Furthermore, such arrangements require the use of O rings of uniform cross-section around their entire circumference. Variations from true concentricity and true uniform cross-section result in seizure of the bushings at the tight spots, and eventually cause cocking of the bushings and unsatisfactory sealing and seating of the bushings on the gear faces.

In accordance with the principles of the present invention, an O ring is provided as shown at 40 and which is selected to have an inner diameter slightly less than the outer diameter of the bushings 17 prescribed by the peripheral surface 18 of the tubular portion of each bushing 17. Thus, the O ring 40 is stretched around the bushing. It is further contemplated by the present invention to surround the rubber O ring 40 with a rigid back-up ring 41. The back-up ring 41 can be made of any rigid material such as metal and is sized to have an inner diameter corresponding generally to the outer diameter of the O ring 40.

As is shown in FIGURE 3, each of the bushings 17 is of a generally circular configuration, however, the flanged portions thereof are flattened as at 42, thereby to provide a chordal abutment surface so that two adjoining bushings 17 are generally figure 8-shaped in configuration. Thus, the rear motive surface 32 of each bushing forms a portion of a figure 8-shaped wall for the pressure control chamber 34. Such configuration facilitates utilization of a plate spring such as the plate spring 43. As shown in FIGURES 1–3, the plate spring 43 is a flat piece of spring metal of a generally figure 8-shaped configuration and each of the respective lobes indicated at 44 and 46, respectively, is characterized by peripheral spring fingers 47 which are struck out from the lobes 44 and 46 and are axially offset. The plate spring 43 is interposed between the motive surfaces 32, 32 of the bushings 17, 17 and the wall 33 of the casing 11. Thus, the spring fingers 47 engage against the surfaces 32 of the bushings 17, while the lobes 44 and 46 engage against the adjoining inner and outer concentrically disposed rings 40 and 41. By virtue of such provision, the plate spring 43 not only mechanically biases the bushing 17 to preload the bushing into sealing engagement with the adjoining side face of the gears 21 ad 22, but the plate spring 43 also operates to bias the rings 40 and 41 towards the radial wall 33, thereby maintaining the O ring 40 in optimum sealing position relative to the adjoining surfaces 18 and 16 between the low pressure area 39 and the high pressure area 34 of the pump.

Although minor modifications might be suggested by those versed in the art, it should be understood that I wish to embody within the scope of the patent warranted hereon all such modifications as reasonably and properly come within the scope of my contribution to the art.

I claim as my invention:

1. A pressure-loaded gear pump comprising a casing having an inlet and an outlet, and a pumping chamber therebetween, meshing gears in said pumping chamber to drive fluid from the inlet to the outlet, said casing having a bore of reduced size extending axially from said pumping chamber, and a generally tubular movable bushing in said bore having a flange at one end thereof forming a front sealing face on one side of said flange for egaging against the adjoining side face of the gears in the pumping chamber and having a rear face forming a motive surface, said motive surface being spaced from an adjoining wall of said casing to form together therewith a pressure chamber, an O ring of a diameter to stretch onto said generally tubular bushing in sealing relation with the peripheral surface thereof and extending into said pressure chamber, a rigid ring in said pressure chamber concentrically outwardly of said O ring and confining said O ring, and a loading spring comprising a flat spring plate in said pressure chamber operatively engaged against said motive surface and said rings, whereby said bushing is sealed in said bore for pressure loading and is mechanically preloaded by said loading spring.

2. A gear pump comprising a casing having a recess forming a pumping cavity, a pair of bores axially adjacent said cavity, a pair of movable bushings in said bores, each being flanged to form a sealing face for engaging the adjoining side faces of the pump gears, said flanged bushings together forming with said casing a pressure chamber outwardly of said bores and behind the flanges of the bushings, an O ring around each bushing, a rigid back-up ring around each O ring, and a figure 8-shaped plate spring in said chamber and having spring fingers bottomed against said flanges of said bushings and engaging said rings to load said O ring into sealing relation between the bushing and the casing.

3. A gear pump comprising a casing having a bore and a counterbore formed therein, a bushing in said bore having a flange extending into said counterbore, said flange having a first sealing face for engaging against the adjoining side face of a gear, and a rear face spaced from an adjoining radial wall of said casing, to form a pressure control chamber, a plate spring interposed between said flange and said radial wall to mechanically preload said bushing, and a pair of concentrically disposed rings surrounding said bushing and extending between said radial wall and said plate spring, and innermost ring comprising a flexible sealing member, the outermost ring comprising a rigid back-up member to prevent extrusion of said sealing member, thereby to seal said movable bushing in said bore.

4. For use in a gear pump, a pair of movable bushings each including a generally tubular body portion having a peripheral surface adapted to be slidably engaged in a pump casing, each said bushing being flanged at one end, said flanged ends being generally circular in configuration but having a flattened chordal portion formed so the two flattened chordal portions abut and engage one another in a pair of said bushings, said flanges of said pair of bushings together forming a generally figure 8-shaped front sealing surface and a generally figure 8-shaped rear motive surface, a figure 8-shaped plate spring having two openings formed therein receiving the tubular portions of said bushings, said plate spring lying adjacent said motive surface, said plate spring having spring fingers axially offset from said plate spring and engaging against the motive surface, and a pair of concentrically disposed rings on each said tubular body portion adjacent said plate spring, the innermost of each said ring comprising a flexible sealing member sized to be stretched over the tubular body portion, and the outermost of each said pair of concentrically disposed rings comprising a rigid back-up member surrounding the sealing member to prevent extrusion of the sealing member, whereby said bushings may be slidably carried in a pump casing and said motive surface spaced from an adjoining casing wall to form a pressure control chamber.

5. A gear pump comprising a casing having a recess forming a pumping cavity, a pair of bores axially adjacent said cavity, a pair of movable bushings in said bores, each being flanged to form a sealing face for engaging the adjoining side faces of the pump gears, said flanged bushings each having a motive surface spaced from an adjoining wall of said casing to form a pressure chamber outwardly of said bores and behind the flanges of the bushings, an O ring for each bushing sized to be stretched over each of said bushings at said pressure chamber, a rigid back-up ring concentrically adjacent and surrounding each said O ring, and biasing means for preloading said bushings and for confining said O rings in said pressure chamber adjacent said flanges to seal the chamber by engaging the O rings into engagement with said adjoining wall of said chamber and with said bushing.

6. A gear pump comprising a casing having a recess forming a pumping cavity, a pair of bores axially adjacent said cavity, a pair of movable bushings in said bores, each being flanged to form a sealing face for engaging the adjoining side faces of the pump gears, said flanged bushings having a motive surface spaced from an adjoining wall of said casing to form a pressure chamber outwardly of said bores and behind the flanges of the bushings, an O ring for each bushing in said pressure chamber sized to be stretched over each said bushing but being of larger size than each of said bores, rigid back-up means concentrically outwardly adjacent and surrounding each said O ring, and biasing means for preloading said bushings and for loading said O rings into sealing relation between the bushing and the casing to seal the pressure chamber by engaging the O ring against said adjoining wall of said casing and against said bushing.

7. A gear pump comprising a casing having a bore and a counterbore formed therein, a bushing in said bore having a flange extending into said counterbore, said flange having a first sealing face for engaging against the adjoining side face of a gear, and a rear face spaced from an adjoining radial wall of said casing to form a pressure control chamber, and a pair of concentrically disposed rings surrounding and resiliently engaging said bushing in said pressure control chamber and adjacent said radial wall, the innermost ring comprising a flexible resilient sealing member resiliently engaging the adjoining wall surfaces of the pressure control chamber, the outermost ring comprising a rigid back-up member surrounding said sealing member to prevent extrusion of said sealing member, thereby to seal said pressure control chamber and to seal said movable bushing in said bore.

8. A gear pump comprising a casing having a recess forming a pumping cavity, a pair of bores axially adjacent said cavity, a pair of movable bushings in said bores, each being flanged to form a sealing face for engaging the adjoining side faces of the pump gears, said flanged bushings each having a motive surface spaced from an adjoining wall of said casing to form a pressure chamber outwardly of said bores and behind the flanges of the bushings, and a pair of rings concentrically disposed around each said bushing and extending outwardly of said bore adjacent the flange into said pressure chamber, the innermost ring comprising a flexible resilient sealing member resiliently engaging said bushing and the adjacent wall surfaces of the pressure control chamber and the outermost ring comprising a rigid back-up member for surrounding said sealing member, whereby said sealing member establishes a sealing relation between the bushings and the casing to seal the pressure chamber.

9. A gear pump comprising a casing having a recess forming a pumping cavity, a pair of bores axially adjacent said cavity, means forming a pair of tubular bearings in said bores and including means extending radially outwardly of said bearings to form a sealing face for engaging the adjoining side faces of the pump gears, said radially outwardly extending means having a rear face spaced from an adjoining wall of said casing to form a pressure chamber outwardly of said means forming said bearings, an O ring in said pressure chamber around each said means forming said bearings and resiliently engaging same in sealing relation, a rigid back-up ring around each O ring and biasing means engaging said rings to load said O ring into sealing relation between the radially outwardly extending means and the casing by engaging the O ring with said adjoining wall of said casing, thereby sealing the pressure chamber.

10. A gear pump comprising a casing having a recess forming a pumping cavity, a pair of bores axially adjacent said cavity, means forming a pair of tubular bearings in said bores and including means extending radially outwardly of said bearings to form a sealing face for engaging the adjoining side faces of the pump gears, said radially outwardly extending means having a motive surface spaced from an adjoining wall of said casing to form a pressure chamber outwardly of said means forming said bearings, an O ring around each said means forming said bearings, a rigid back-up ring around each O ring and biasing means engaging said rings to load said O ring into sealing relation between the radially outwardly extending means and the casing by engaging said O ring against said bearings and said adjoining wall, said biasing means comprising a figure 8-shaped plate spring in said chamber.

References Cited in the file of this patent

UNITED STATES PATENTS

| 2,682,836 | Orr | July 6, 1954 |
| 2,792,788 | Eames | May 21, 1957 |
| 2,808,785 | Hilton | Oct. 8, 1957 |
| 2,816,512 | Murray | Dec. 17, 1957 |
| 2,824,522 | Compton | Feb. 25, 1958 |
| 2,824,523 | Campbell et al. | Feb. 25, 1958 |
| 2,881,704 | Murray | Apr. 14, 1959 |
| 2,923,248 | Hodgson | Feb. 2, 1960 |

FOREIGN PATENTS

| 508,229 | Italy | Jan. 5, 1955 |
| 536,036 | Italy | Nov. 21, 1955 |
| 1,142,537 | France | Apr. 1, 1957 |